March 2, 1965  J. E. LOTT  3,171,310
AUTOMATIC CONTROL FOR MACHINE TOOL
Filed Sept. 23, 1963  4 Sheets-Sheet 1
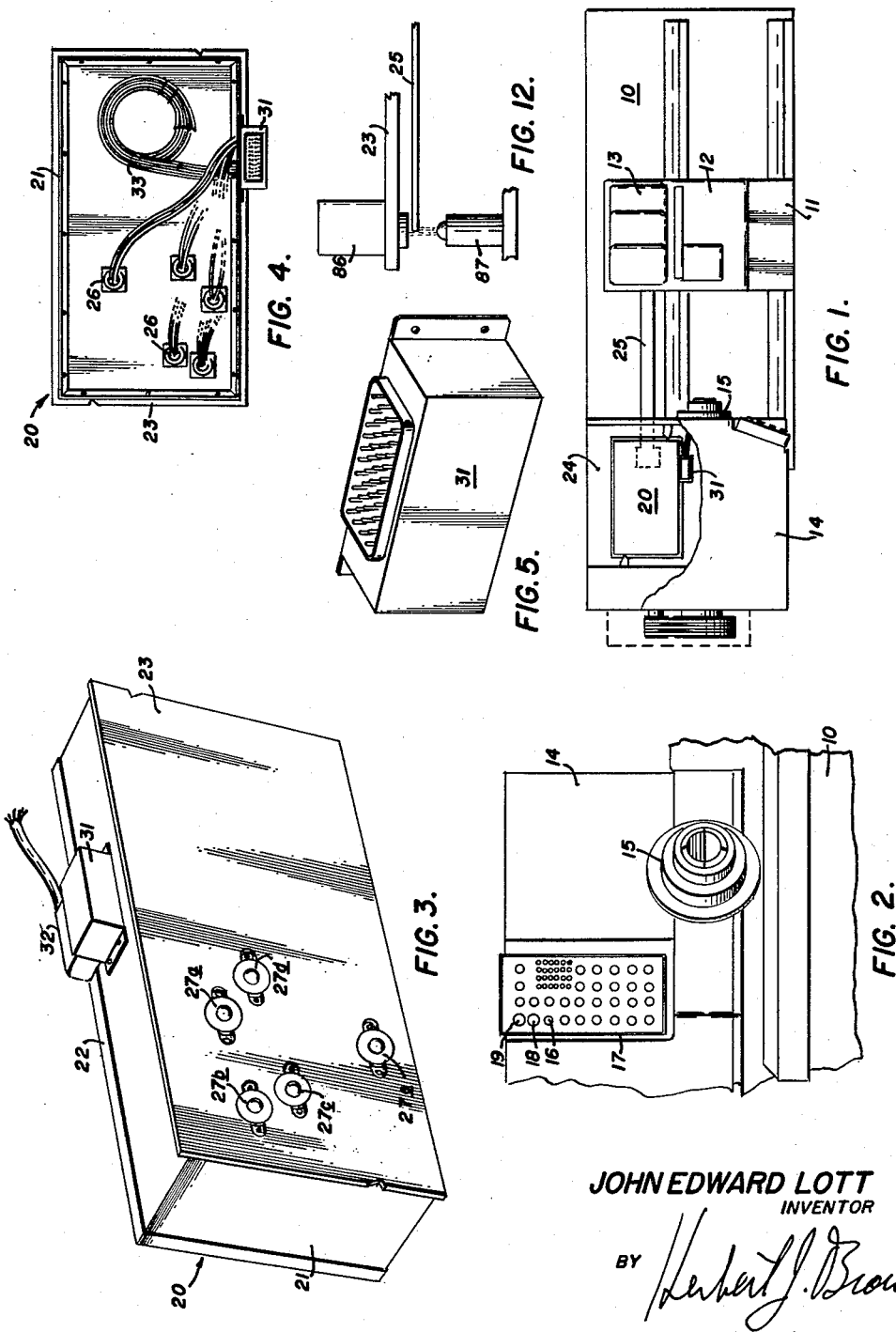
JOHN EDWARD LOTT
INVENTOR
BY *[signature]*
ATTORNEY

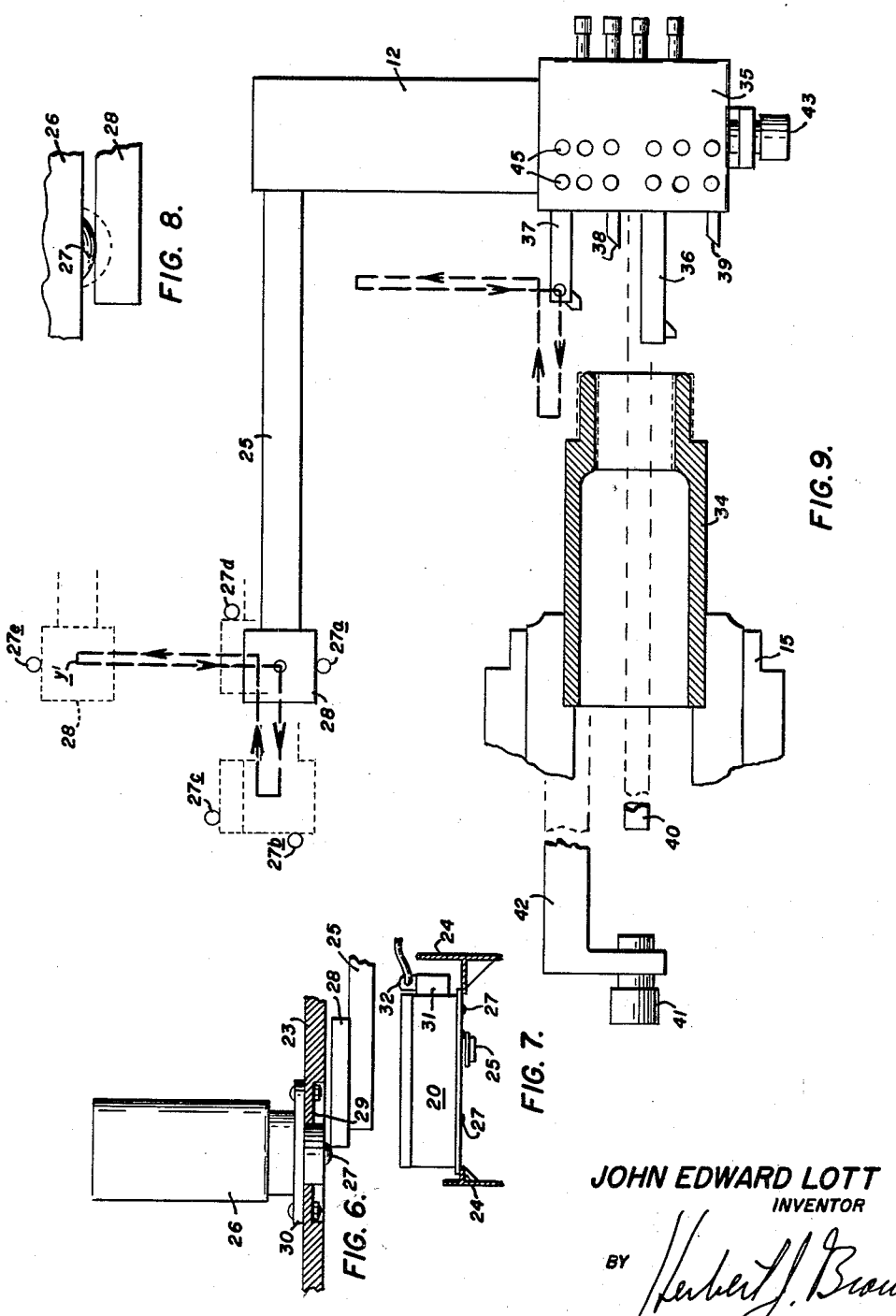

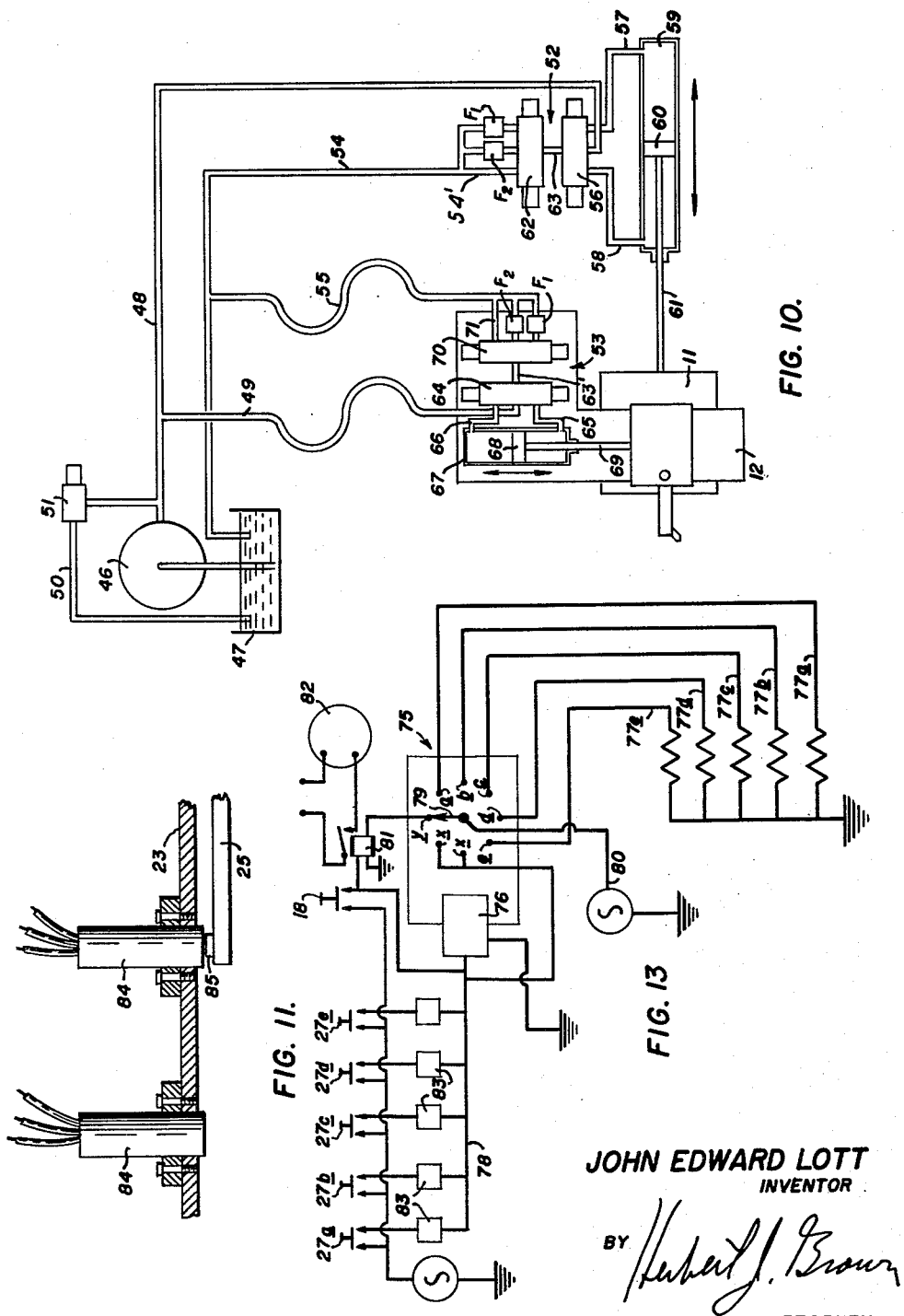

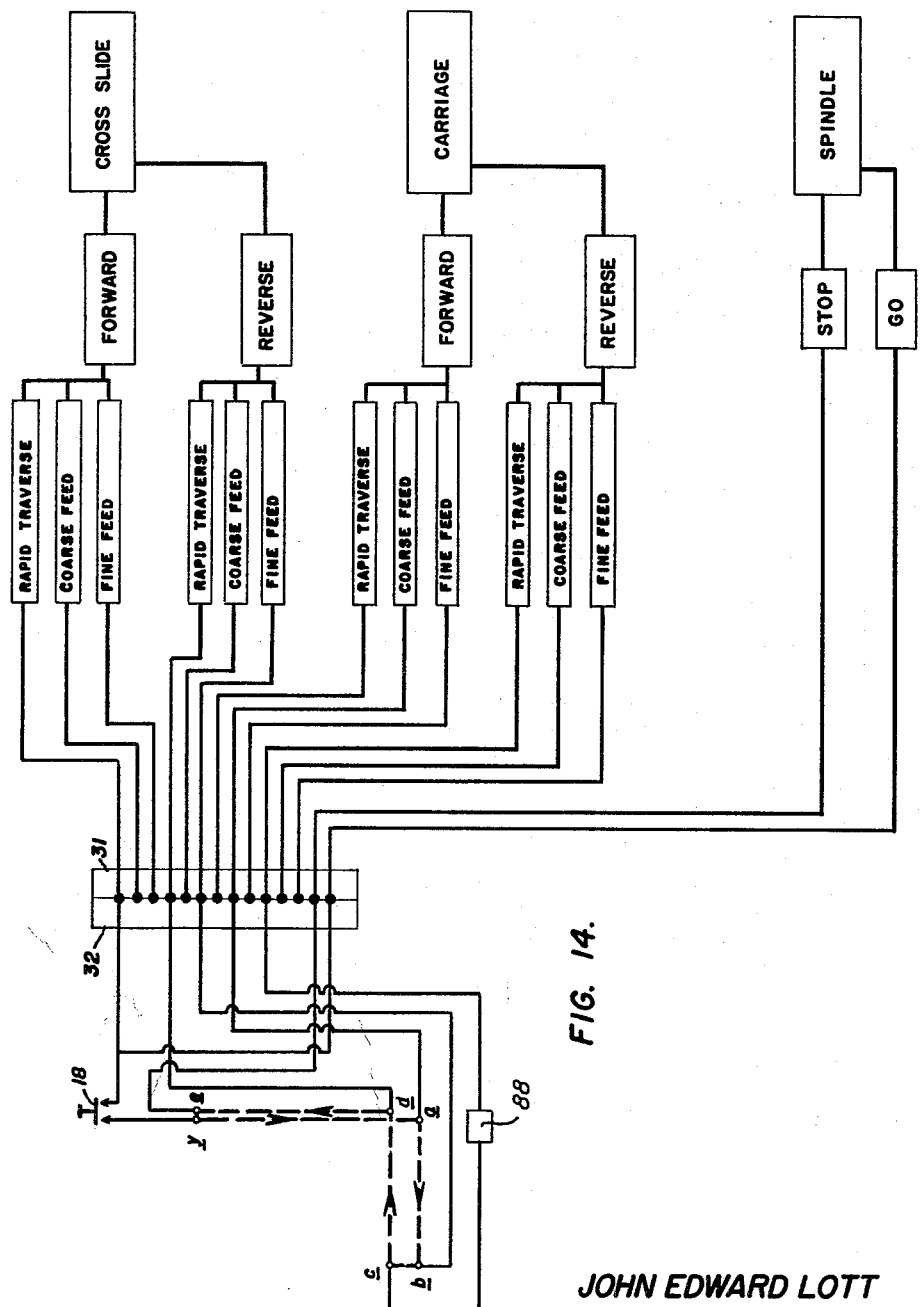

United States Patent Office 3,171,310
Patented Mar. 2, 1965

3,171,310
AUTOMATIC CONTROL FOR MACHINE TOOL
John Edward Lott, Fort Worth, Tex., assignor to American Manufacturing Company of Texas, Fort Worth, Tex., a corporation of Texas
Filed Sept. 23, 1963, Ser. No. 310,765
3 Claims. (Cl. 82—14)

This invention relates to machine tools and has reference to a programming device for automatically machining numerous identical parts. While the invention is adaptable to various machine tools, the present description has reference to a hydraulically operated lathe.

An object of the invention is to provide simple automatic means for performing a series of cutting operations normally performed by an operator.

A particular object is to provide a program package for controlling a machine tool, and which package may be stored and then used again when required.

Another object is to provide different program packages, each for acting on a different work piece, in combination with a machine tool operated at least in part by electrical circuits comprising permanent parts thereof, and wherein those circuits do not have to be charged when changing from one program package to another.

Another object is to provide means coacting a movable part of the machine tool and a stationary part thereof and thereby actuating the program package.

A specific object is to provide, in combination with a hydraulically operated lathe, a finger carried by the carriage and cross-slide and actuating switches or the like in the program package.

Another object, in combination with the foregoing, is to provide stop means to accurately limit length and depth of cuts performed by the machine tool.

A further object is to provide, in an automatically controlled hydraulic lathe, either rapid travel or slower cutting feeds as required by the sequence of steps of the work being performed.

These and other objects of the invention will become apparent from the following description and the accompanying drawings, in which:

FIGURE 1 is a top plan view of a lathe and showing an exemplary form of the invention installed thereon.

FIGURE 2 is a fragmentary elevational view of the headstock of the lathe taken at an angle with reference to FIGURE 1.

FIGURE 3 is a perspective view of a program package in accordance with the invention.

FIGURE 4 is a plan view of the program package with the cover removed and showing the inside of the case.

FIGURE 5 is an enlarged perspective view of the multiple pin electrical socket which is a part of the program package.

FIGURE 6 is an enlarged elevational and sectional view of one of the limit switches comprising a part of the program package and showing the extending end of a finger, carried by the lathe carriage and cross-slide, in contact therewith.

FIGURE 7 is an end elevation of the program package supported on brackets, the latter being shown in section, and illustrating the position of the limit switch buttons relative to the actuating finger.

FIGURE 8 is an enlarged fragmentary elevational view showing the finger actuating the spherical button of a limit switch.

FIGURE 9 is a schematic diagram showing the operation of the invention as applied to a work piece.

FIGURE 10 is a diagram of an electrically operated conventional hydraulic system of a lathe.

FIGURE 11 is an elevational and sectional view of a modified form of the invention wherein proximity switches are employed instead of the limit switches just referred to.

FIGURE 12 is a fragmentary elevational view of a further modified form of the invention wherein photoelectric switches are employed instead of limit switches.

FIGURE 13 is a wiring diagram of an electrical circuit coacting the switches of the program package with the electrically operated valves of the hydraulic system.

FIGURE 14 is a schematic diagram showing a different arrangement wherein the wiring of program package may be connected with the standard wiring of a machine tool without changing such standard wiring.

The lathe illustrated in FIGURES 1 and 2 is conventional and includes a bed 10, carriage 11 and cross-slide 12. Cutting tools are not shown in FIGURE 1, but mounting pads therefor are indicated at 13. The headstock 14 includes a collet type chuck 15 which is operated by a button, such as 16, on a control panel 17. The control panel 17 is conventional and is designed for operation of the lathe without the present invention except for the chuck operating button 16, and start button 18 and emergency stop button 19.

Referring particularly to FIGURES 3 and 4, a program package 20 comprises an essential feature of the invention and the one shown includes a rectangular case 21, a removable cover 22 and a switch locating plate 23 across the bottom. As shown in FIGURES 1 and 7, the program package 20 is mounted in the headstock 14 on brackets 24 in a manner to provide space for the extending end of a finger 25 beneath the package. As shown in detail in FIGURE 6, limit switches 26 are mounted in the plate 23 and have spherical buttons 27 projecting therebeneath for coaction with a rectangular finger plate 28 on the extending end of the finger 25. The detail, FIGURE 6, illustrates a counterbore 29 in the bottom of the plate 23, and a fastener 30 on the plate above the counterbore for holding the limit switch 26 in place. FIGURE 8 illustrates a button 27 in its actuated position. On one side of the package 20 there is a multiple pin electrical socket 31 connecting the limit swtiches 26 with a plug 32 which, in turn, is connected with the electrically operated valves of the conventional hydraulic system illustrated in FIGURE 10. As shown in FIGURE 4, extra wires 33 from the socket 31 are coiled in the case 21, it being understood that the limit switches 26 may be relocated from time to time and that additional such switches may be added in accordance with the requirements of work pieces to be machined. However, it is a purpose of the invention to have multiple program packages, each for a separate work piece, which may be stored for future use.

Referring now to FIGURE 9 wherein a work piece 34 is mounted in the chuck 15 and wherein a tool block 35 is mounted on the cross-slide 12 for holding cutting tools 36, 37, 38 and 39, there is a carriage stop bar 40 mounted on the carriage 11 and extending toward the headstock 14. Neither the carriage 11 nor the headstock 14 is shown in this view. An adjustable carriage stop 41 is mounted on a stationary part 42 of the lathe opposite the extending end of the carriage stop bar 40, and which stop is standard equipment on some lathes. Similarly, there is an adjustable stop 43 on the near side of the carriage 11 to stop movement of the cross-slide 12 in that direction. Details of the tool block 35 include micrometer heads 44 for adjusting the cutting tools 36–39 and locking screws 45 for securing the tools in place.

Referring now to the upper left portion of FIGURE 9, the limit switch buttons 27 have letter suffixes to indicate the sequence of operations. 27e represents both the start and finish positions, 27a the carriage forward movement and the turning and boring operations; 27b starts the facing cut and moves the cross-slide 12 laterally; 27c reverses the carriage 11, and 27d moves the carriage 12 laterally and rapidly to starting position 27e which stops the operation.

In order to explain the exemplary wiring diagram, FIGURE 13, reference is first made to the hydraulic system illustrated in FIGURE 10. This system is conventional and was, prior to the present invention, operated by manual buttons, not numbered, on the operating panel 17. The system includes a pump 46, a reservoir 47, pressure supply lines 48 and 49 from the pump, a by-pass line 50 connecting both pressure lines with the reservoir, a relief valve 51 in the by-pass line, control valve assemblies 52 and 53 connected with the pressure lines 48 and 49 for actuating the carriage 11 and cross-slide 12, respectively, and return lines 54 and 55 connected therewith.

The carriage control valve assembly 52 includes a solenoid operated direction control valve 56, the ends of which are connected, by lines 57 and 58, with the ends of a carriage feed cylinder 59. A piston 60 in the cylinder 59 is connected with the carriage 11 by means of a rod 61. Depending on the setting of the valve 56, one line 57 or 58 is a pressure line and the remaining line is a return line which is connected with a solenoid operated speed control valve 62 by a line 63. The speed control valve 62 has a rapid travel connection $54^1$ connected with the return line 54 and additionally includes adjustable flow control valves F1 and F2 which are also connected with the return line to reservoir 47.

Similarly, the cross-slide valve assembly 53 includes a solenoid operated direction control valve 64, the ends of which are connected by lines 65 and 66 with the ends of a cylinder 67 having a piston 68 therein connected with the cross-slide 12 by a rod 69. This assembly, 53, includes a solenoid operated speed control valve 70, connected with the direction control valve 64 by a line $63^1$ and, like the first described speed control valve 62, includes a rapid travel connection 71 and adjustable valves F1 and F2 connected with the return line 55.

The wiring diagram in FIGURE 13 is exemplary, it being understood that other circuits may be employed for connecting the various limit switches 27 with the valve assemblies 52 and 53. In this particular circuit there is a stepping relay generally indicated at 75 and including an activating element 76 and contact points a through e to complete a series of working circuits 77a through 77e more fully described hereinafter. The limit switches 27 and the manual starting switch 18 are connected to the activating element 76 by an operating circuit 78. A rotating armature 79 in the stepping relay 75 completes the respective working circuits 77 through an auxiliary power source 80.

Unused contact points X in the stepping relay are wired to feed back into the activating element 76 so that the armature 79 will complete its cycle after passing the last used contact point e. The remaining contact point y connects the auxiliary circuit 80 with a starting relay 81 for starting and stopping the the spindle drive motor 82. With the armature 79 in the position shown in FIGURE 13 and the motor 82 turned off, the finger plate 28 in FIGURE 9 will be in the position indicated at $y^1$.

After a finished work piece has been removed and a new one inserted in the chuck 15 the operator presses the manual starting button 18. The relay 81 starts the motor 82 and the armature 79 advances to contact point a. A parallel circuit, not shown, at the same time closes the by-pass valve 51 in the hydraulic line 50 (FIGURE 10).

The working circuit 77a is conventionally connected to the valve assembly 53 to cause the carriage 11 to move towards its first working position and the finger plate 28 to approach the limit switch 27a. When the finger plate 28 touches the limit switch 27a the armature 79 advances to contact point b and working circuit 77b conventionally connected to valve assembly 52 causes the tool block to advance for the first cut until the finger plate 28 touches the limit switch 27b. This process is repeated until the finger plate 28 returns to position y where the circuit 80 stops the motor 82 by means of the relay 81 after the working circuit 77e has operated the valve assembly 53 to retract the tool block and has also opened the hydraulic by-pass valve 51. The work piece 34 is then removed and the cycle repeated. Adjustable delayed action relays 83 are included in the circuit 78 where needed to allow the cut to be finished to the required tolerance after the next limit switch 26 has been contacted.

The proximity switches 84 illustrated in FIGURE 11 may be used in place of the limit switches 26 and instead of the contacting plate 28 on the finger 25 there is a ferrous plate 85 for actuating the switches. All other parts and operations are in accordance with the foregoing.

Similarly, the photoelectric switches 86, FIGURE 12, may take the place of the limit switches 26, and the switches shown have upwardly directed lamps 87 thereneath, the beams of which are interrupted by the extending end of the finger 25.

The diagram illustrated in FIGURE 14 is different from FIGURE 13 in that the standard electrical and pneumatic systems of the machine tool are employed without alteration. The standard systems are illustrated by a block diagram at the right of the pin socket 31 and plug 32, and the wiring diagram to the left of the socket and plug includes the same arrangement of switches, a through e, as 27a through 27e as described in connection with the upper left portion of FIGURE 9. All of the primary motions of the lathe are identified by legends and it is to be noted that only those motions required are connected with the programmed arrangement of switches. As before, contact of the finger 25 changes the direction in sequence, and in the wiring diagram there is shown a time delay relay to accommodate delayed action required when the carriage stop bar 40 contacts the carriage stop 41.

The invention is not limited to the exemplary constructions herein shown and described, but may be made in various ways within the scope of the appended claims.

What is claimed is:

1. In combination with a hydraulically operated machine tool having a carriage and a cross-slide, a program package mounted on a stationary portion of said machine tool, at least three switches on said package arranged to define an angle, a finger mounted on said cross-slide and extending in a direction to effect contact of said switches when said carriage and said cross-slide are moved, means moving said carriage and said cross-slide independently of each other, and hydraulic control means including the switches of said program package directing the direction of movement and distance of said carriage and said cross-slide.

2. The combination defined in claim 1 and including adjustable mechanical stop means limiting the travel of said carriage and said cross-slide.

3. The combination defined in claim 1, the construction wherein said switches in said program package are mounted in a plate and located in a plane defined by the movement of said finger, said plate being removably mounted on said stationary portion of said machine tool.

References Cited by the Examiner
UNITED STATES PATENTS

| | | | |
|---|---|---|---|
| 2,731,572 | 1/56 | Cobert | 307—112 |
| 3,039,035 | 6/62 | Rudolf et al. | 318—162 |

ANDREW R. JUHASZ, Primary Examiner.

L. PEAR, Examiner.